United States Patent Office 2,782,782
Patented Feb. 26, 1957

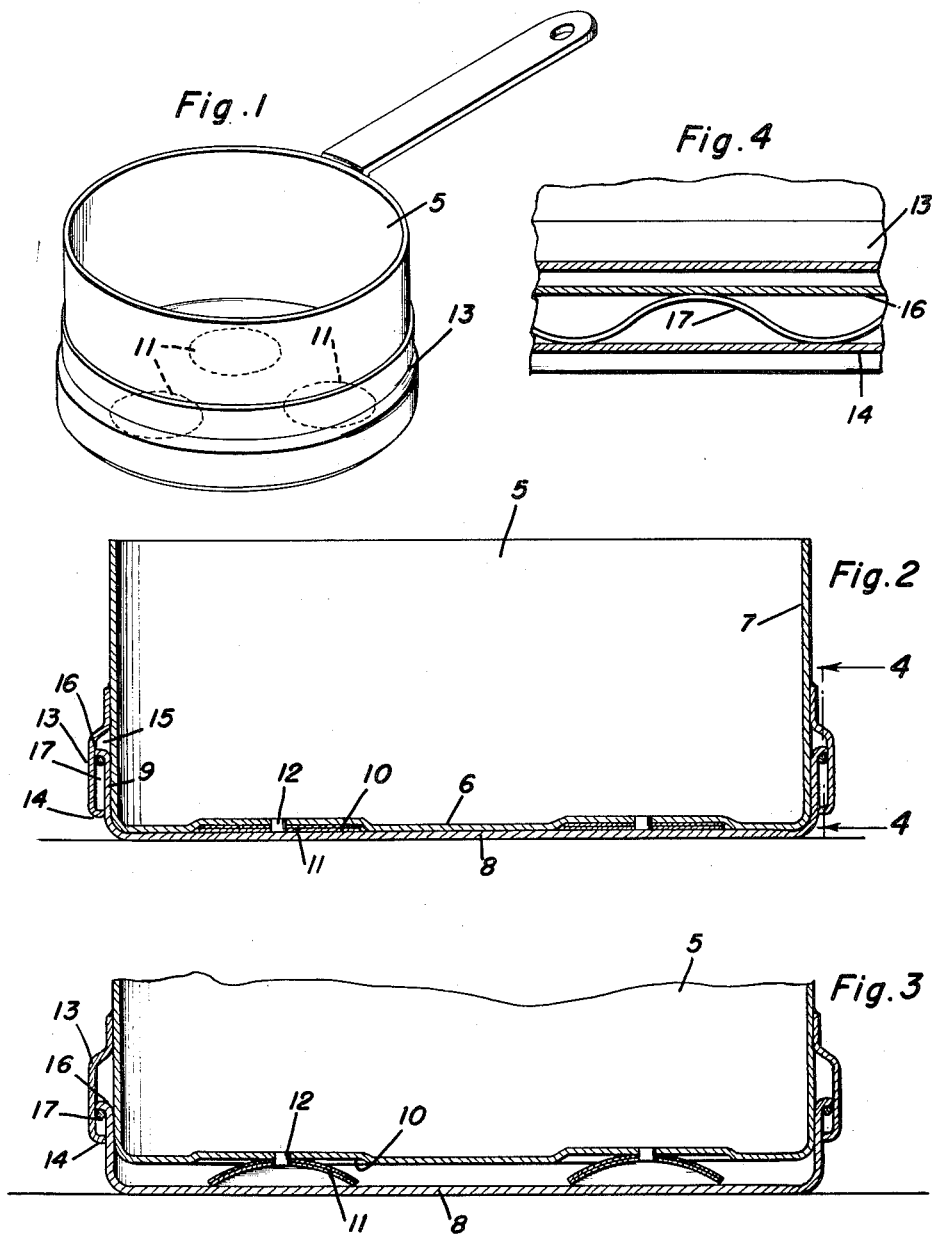
Alfred R. Taylor
INVENTOR.

2,782,782
HEAT REGULATED COOKING VESSEL
Alfred R. Taylor, East Haven, Conn.
Application June 24, 1954, Serial No. 439,001
4 Claims. (Cl. 126—374)

The present invention relates to new and useful improvements in cooking vessels and more particularly to heat regulated means to prevent burning of food while being cooked in the vessel or to prevent the contents from boiling over.

An important object of the present invention is to provide a cooking vessel constructed with a double bottom, one movable relative to the other, and placing bimetallic elements between the inner and outer bottoms and responsive to predetermined heat subjected to the vessel to elevate the inner bottom and reduce the heat subjected thereto.

Another object of the invention is to provide spring means effectively holding the inner and outer bottoms of the vessel in close contact with each other to economize in the consumption of heat under normal cooking conditions.

A still further object is to provide a cooking vessel of this character of simple and practical construction, which is efficient and reliable in operation, relatively inexpensive to manufacture and otherwise well adapted for the purpose for which the same is intended.

Other objects and advantages, which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is an enlarged vertical sectional view showing the inner and outer bottoms in close contacting position for cooking under normal conditions;

Figure 3 is a similar view showing the bimetallic elements separating the inner and outer bottoms when the vessel has become overheated; and Figure 4 is an enlarged fragmentary sectional view taken on a line 4—4 of Figure 2.

Referring now to the drawing in detail wherein for the purpose of illustration I have disclosed a preferred embodiment of the invention, the numeral 5 designates a circular open cooking vessel or pan which includes a bottom 6 and side walls 7. A heat regulating or safety bottom 8 is positioned under the main or inner bottom 6 and the safety bottom 8 is also formed with walls 9 in which the lower portion of the vessel 5 is closely and slidably fitted.

The underside of the main or inner bottom 6 is formed with a plurality of circular recesses 10 in which bimetallic or thermostatic discs 11 of a conventional type are secured by rivets or other suitable fasteners 12 at the center of the discs.

A ring 13 of substantially strap metal construction is welded or otherwise suitably secured at its upper edge to the outer surface of the walls 7 of the vessel 5 and the lower edge of the ring is formed with an inwardly projecting lip 14 to space the ring from the walls of the vessel to provide an annular chamber 15 therein. The upper edge of the walls 9 of the safety bottom 8 is formed with an outwardly projecting lip 16 which overlies the lip 14 in spaced relation therefrom and an undulated wire ring 17 is positioned between lips 14 and 16 to urge the safety bottom 8 upwardly in close contacting engagement with the main or inner bottom 6 of the vessel, as shown in Figure 2 of the drawings.

In the operation of the device the spring 17 normally maintains the inner bottom 6 and the safety bottom 8 of the vessel in close contacting engagement during normal cooking conditions, but should the temperature of the vessel increase abnormally, the bimetallic discs 11 will flex into a concavo-convex or dome-shaped position, as shown in Figure 3 of the drawing and cause a separation of the main or inner bottom 6 from the safety bottom 8 to space the former above the latter so as to elevate the vessel sufficiently and result in a lowering of the temperature subjected to the main or inner bottom 6 of the vessel to avoid burning of the contents thereof or to prevent boiling over of water or other liquid contained in the vessel.

The overlapping arrangement of the ring 13 with respect to the walls 9 of safety bottom 8 of the vessel prevent the entrance of liquid between the inner and outer bottoms 6 and 8.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A cooking vessel including a fixed bottom, an auxiliary bottom underlying and normally in direct contact with the fixed bottom, means connecting the auxiliary bottom to the vessel for vertical movement toward and away from the fixed bottom, and thermal responsive means positioned between the fixed and auxiliary bottoms and operating to separate the same when subjected to predetermined temperature.

2. A cooking vessel including inner and outer bottom portions, means freely connecting said bottom portions to each other and tending to urge the same in confronting relation with each other, and a plurality of bimetallic elements positioned between said bottom portions and responsive to predetermined temperature variations to control movement of the latter toward or away from each other.

3. A cooking vessel including a fixed bottom, an auxiliary bottom telescopically connected to the underside of the vessel, spring means urging the auxiliary bottom inwardly into contact with the fixed bottom, and thermal responsive means positioned between the fixed bottom and the auxiliary bottom and moving the latter outwardly when subjeced to predetermined temperature variations.

4. A cooking vessel including a fixed bottom, a ring externally of the vessel and fixed thereto, an inwardly projecting lip on the ring, an auxiliary bottom telescopically engaged with the vessel at the underside of the fixed bottom, an outwardly projecting lip on the auxiliary bottom and overlying the first named lip, spring means positioned between said lips and urging the auxiliary bottom inwardly on the vessel, and thermal responsive means positioned between the fixed bottom and the auxiliary bottom and moving the latter outwardly to space the same from the fixed bottom when subjected to predetermined temperature variations.

References Cited in the file of this patent
UNITED STATES PATENTS

| 486,157 | Cloud | Nov. 15, 1892 |
| 2,446,605 | Ohlson | Aug. 10, 1948 |
| 2,620,788 | Rivoche et al. | Dec. 9, 1952 |

FOREIGN PATENTS

| 10,775 | Great Britain | of 1888 |